United States Patent [19]
Paris, Sr.

[11] Patent Number: 4,681,134
[45] Date of Patent: Jul. 21, 1987

[54] VALVE LOCK

[76] Inventor: Raymond L. Paris, Sr., 3007 Bud Ct., Rte. 8, Joliet, Ill. 60436

[21] Appl. No.: 888,591

[22] Filed: Jul. 23, 1986

[51] Int. Cl.⁴ ............................................. F16K 35/00
[52] U.S. Cl. .................................... 137/385; 137/382; 70/177; 70/212
[58] Field of Search ................. 70/176, 177, 178, 212; 137/382, 385

[56] References Cited

U.S. PATENT DOCUMENTS

| | | | |
|---|---|---|---|
| 1,334,987 | 3/1920 | Carpenter | 70/212 |
| 1,339,083 | 5/1920 | Wood-Smith | 137/385 |
| 1,496,096 | 6/1924 | Mullins | 137/385 |
| 1,714,856 | 5/1929 | Douglas | 70/176 |
| 1,947,081 | 2/1934 | Grady et al. | 70/178 |
| 4,397,332 | 8/1983 | Sample | 137/385 |
| 4,513,773 | 4/1985 | Hardiman, Jr. | 137/382 |
| 4,516,414 | 5/1985 | Woolvin | 137/385 |

FOREIGN PATENT DOCUMENTS 528287  11/1921  France ................................. 70/212

Primary Examiner—A. Michael Chambers
Attorney, Agent, or Firm—Ernest Kettelson

[57] ABSTRACT

A valve lock for a tank truck comprising an elongated straight length of strap metal having a shorter leg at each end projecting laterally in the same direction therefrom. The shorter leg at one end is secured to an upstream portion of the valve body which connects to the conduit leading from the tank of the truck, and the shorter leg at the other end is releasably secured to the rotary valve operator or valve handle to prevent its movement from the valve closed position to the valve open position until released. The lock device is positioned in such a way that the elongated portion of strap metal bears firmly against a portion of the valve body, such as its outlet spout, to further restrain rotation of the valve operator or valve handle in the direction of rotation which would open the valve. Such restraint substantially lessens the forces that would otherwise be transmitted to the short leg of the device and the means by which it is secured to an upstream portion of the valve body in the event someone attempts to apply force to open the valve and break the lock.

9 Claims, 10 Drawing Figures

VALVE LOCK

BACKGROUND OF THE INVENTION

This invention relates to the field of locks for the valves beneath the storage tanks of tank trucks to prevent unauthorized or accidental opening of the valve and emptying of the contents of the storage tank.

Prior art valve locks have included the angled or stepped member disclosed in U.S. Pat. No. 4,397,332 secured at one end to the valve outlet and the other end being received between spokes of the valve operator or valve handle.

U.S. Pat. No. 1,550,487 discloses a strap member pivotally mounted to a portion of the valve body at one end for movement between a valve locking position and a valve release position, the strap member having a V-notch in an intermediate portion which is in registration with the angular shaft of the valve operator when pivoted to the valve locking position. The other end of the strap member includes an aperture to receive the loop or hook member 30 projecting from a portion of the valve body, after which a padlock can be locked in place through the member 30 to hold the strap member in valve locking position against the angular shaft of the valve operator to prevent it from being turned.

U.S. Pat. No. 1,496,096 discloses a lever assembly to raise and lower the fill pipe 10 of a fluid filling standpipe for locomotives in which the valve operator can be locked when the fill pipe 10 is raised outwardly from the fill port of a locomotive's tank.

U.S. Pat. No. 1,339,083 discloses an outlet valve mechanism for tank cars in which the shackle of a padlock can be placed between the spokes of the hand wheel of the valve operator and through the aperture of a strap member positioned adjacent thereto, whereby the hand wheel cannot be rotated until the padlock is removed.

U.S. Pat. No. 1,293,095 discloses an automobile lock in which a valve is mounted in the fuel line between the gasoline tank and the carbureter with the valve stem projecting upwardly through the floor board of the car for rotating between a valve closed and valve open position. The free end of the valve stem includes a ring or eyelet to receive the shackle of a padlock when in the valve closed position, the shackle also passing through a corresponding eyelet of an anchor post to thereby lock the valve stem in the valve closed position.

None of the prior art devices include the feature of an intermediate portion of the lock device bearing against a portion of the valve body to further restrain movement of the valve operator toward the valve opening position. Such prior art lock devices can therefore be more easily forced and broken. The present invention solves that problem.

DESCRIPTION OF THE PREFERRED EMBODIMENT

Figure 1:
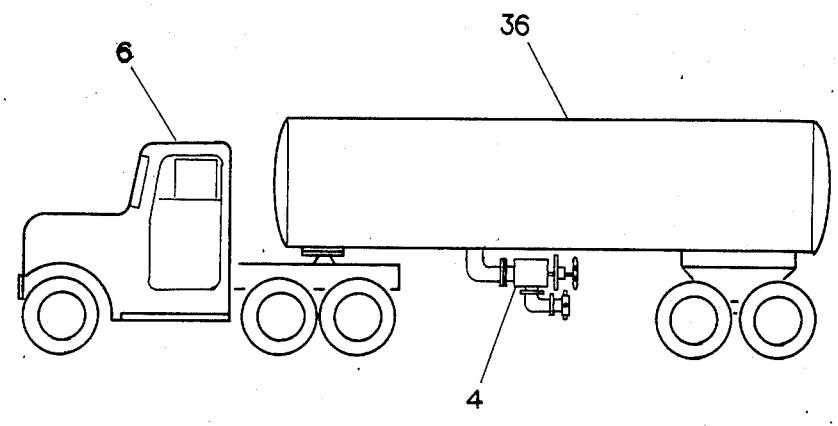
FIG. 1 is a side elevation of a tank truck having an outlet valve for which the valve lock in accordance with this invention is used.
Figure 2:
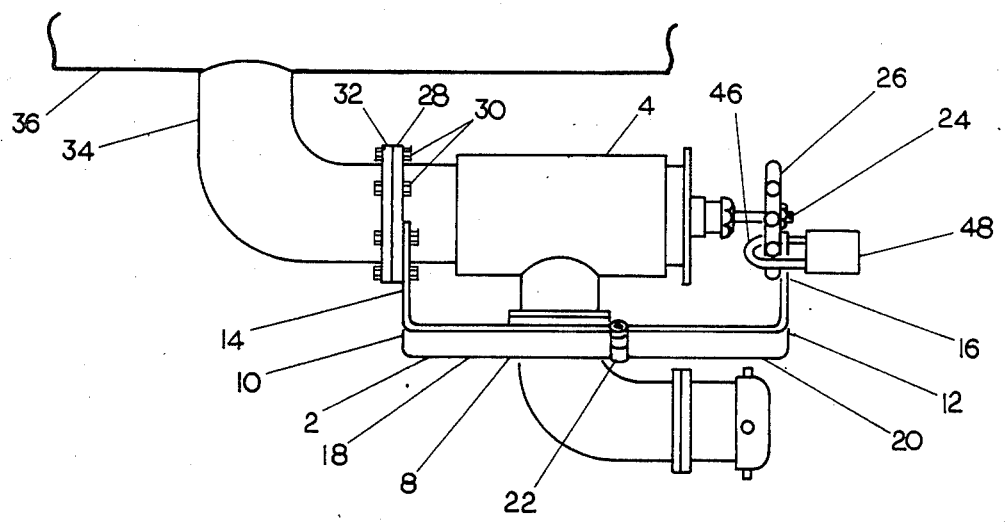
FIG. 2 is a side elevation of the outlet valve of a tank truck showing the valve lock in accordance with this invention locked in place to prevent unauthorized opening of the valve.
Figure 3:
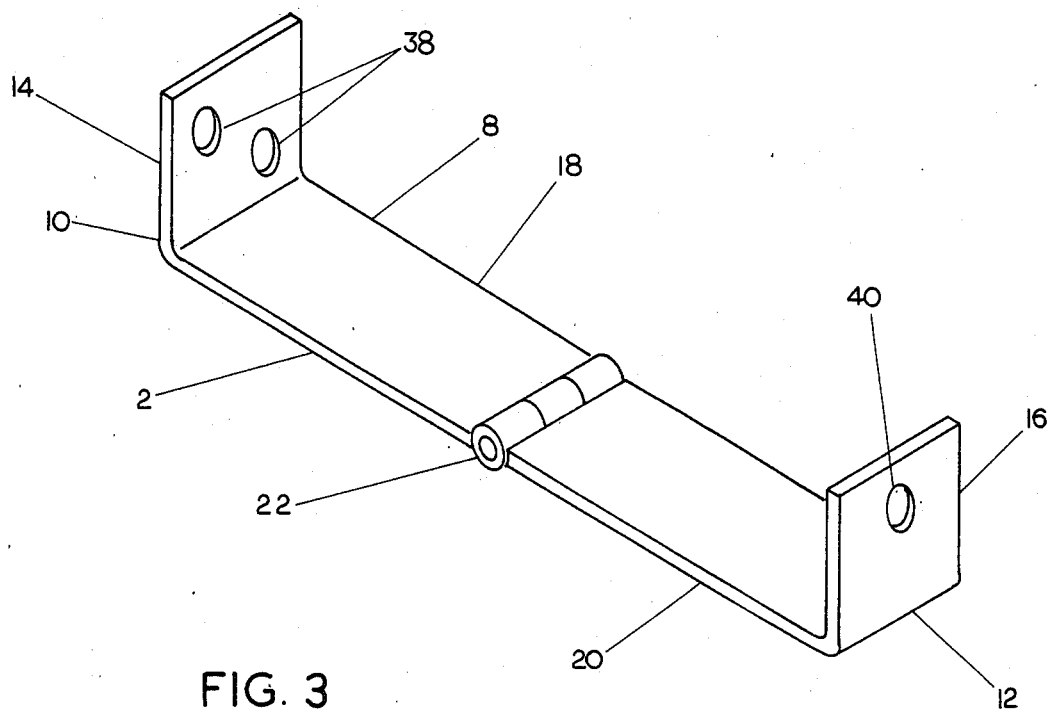
FIG. 3 is an isometric view of the valve lock in accordance with this invention.
Figure 4:
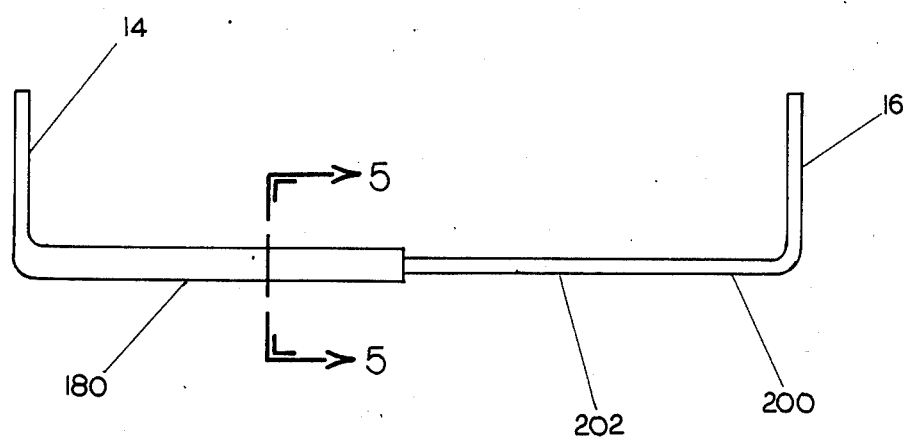
FIG. 4 is a side elevation view of a first modified form of the invention having telescoping sections.
Figure 5:
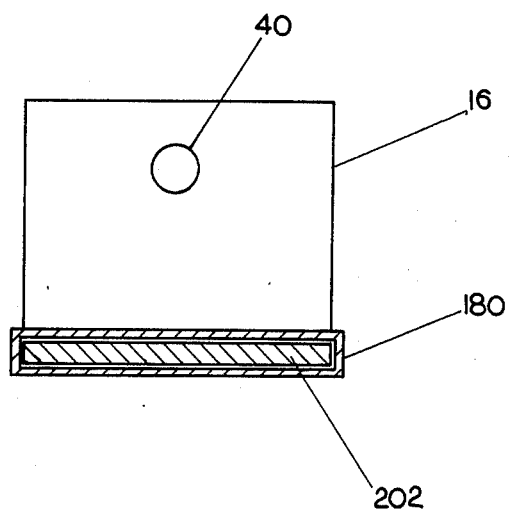
FIG. 5 is a section view taken on line 5—5 of FIG. 4.
Figure 6:
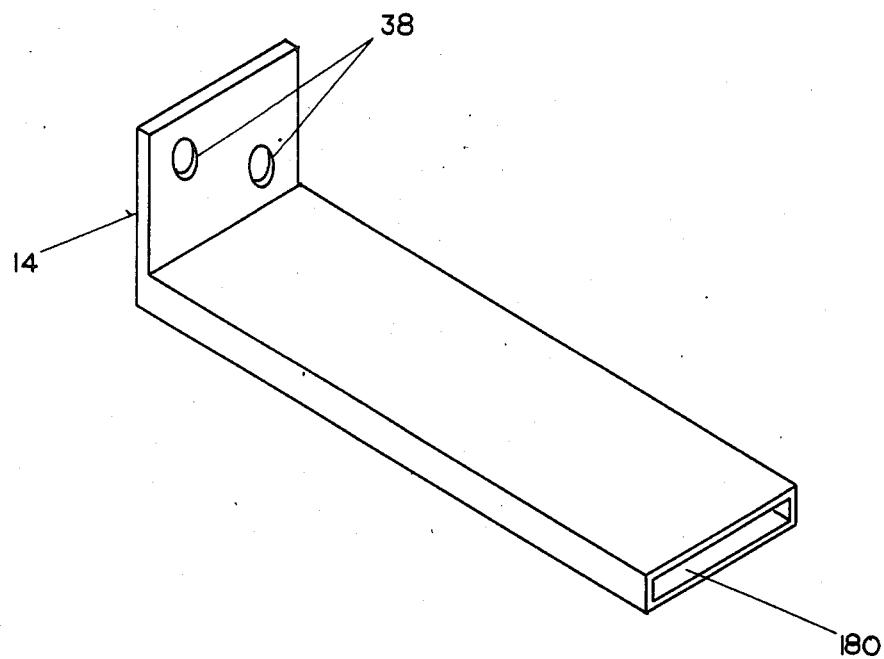
FIG. 6 is a perspective view of the tubular section of the modification shown in FIG. 4.
Figure 7:
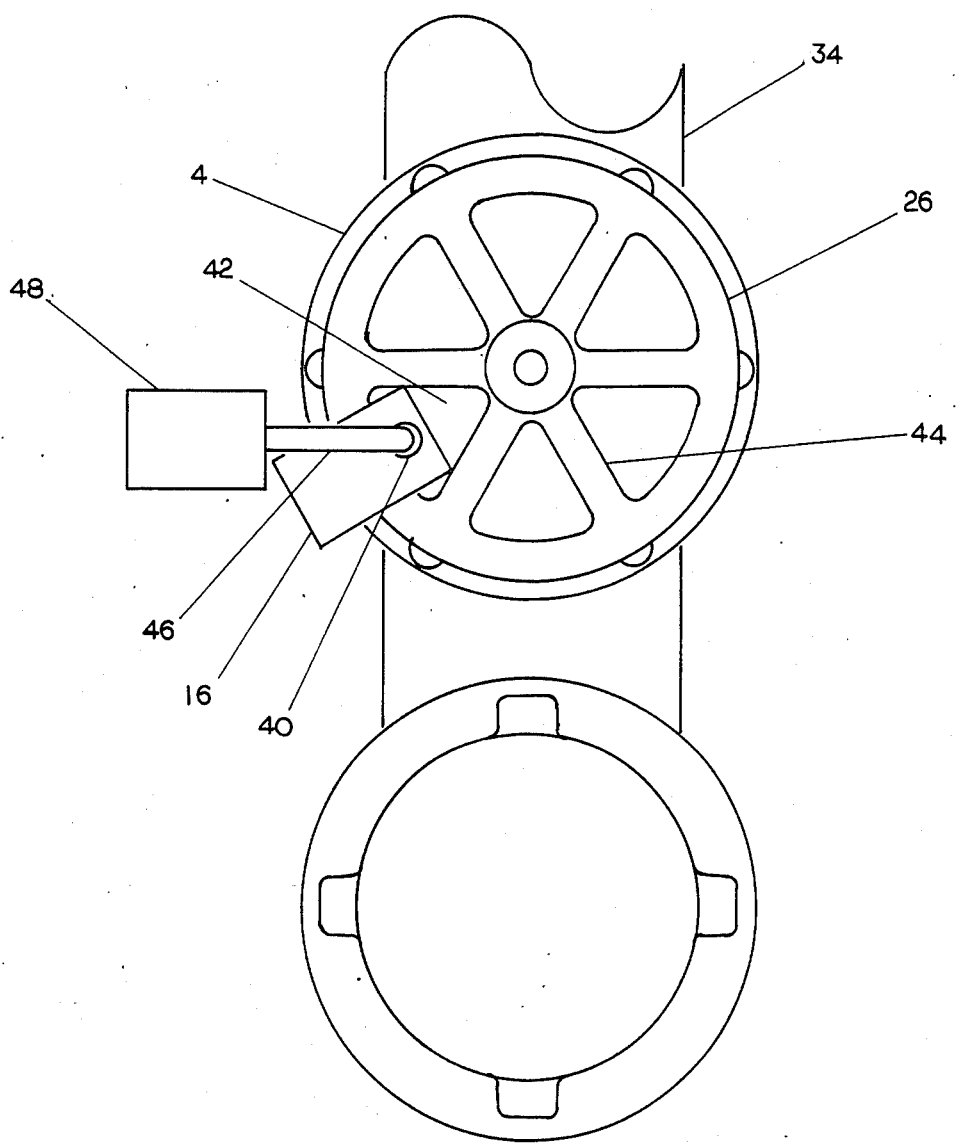
FIG. 7 is an end elevation view of the outlet valve of the tank truck showing an end elevation view of the valve lock secured to the valve hand wheel by a padlock.
Figure 8:
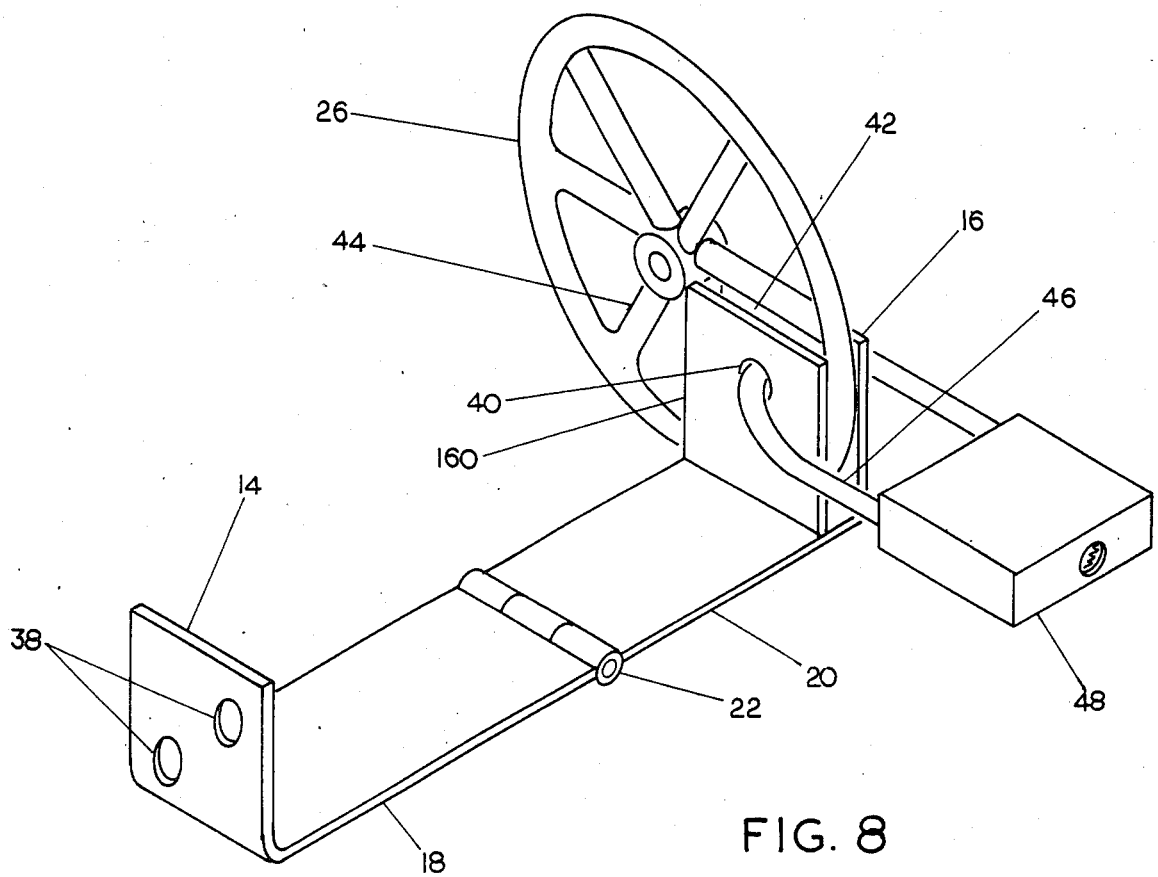
FIG. 8 is a perspective view of a second modification of the invention having two locking legs to sandwich the valve hand wheel therebetween, the hand wheel portion valve being shown sandwiched between the two locking legs and secured by a padlock.
Figure 9:
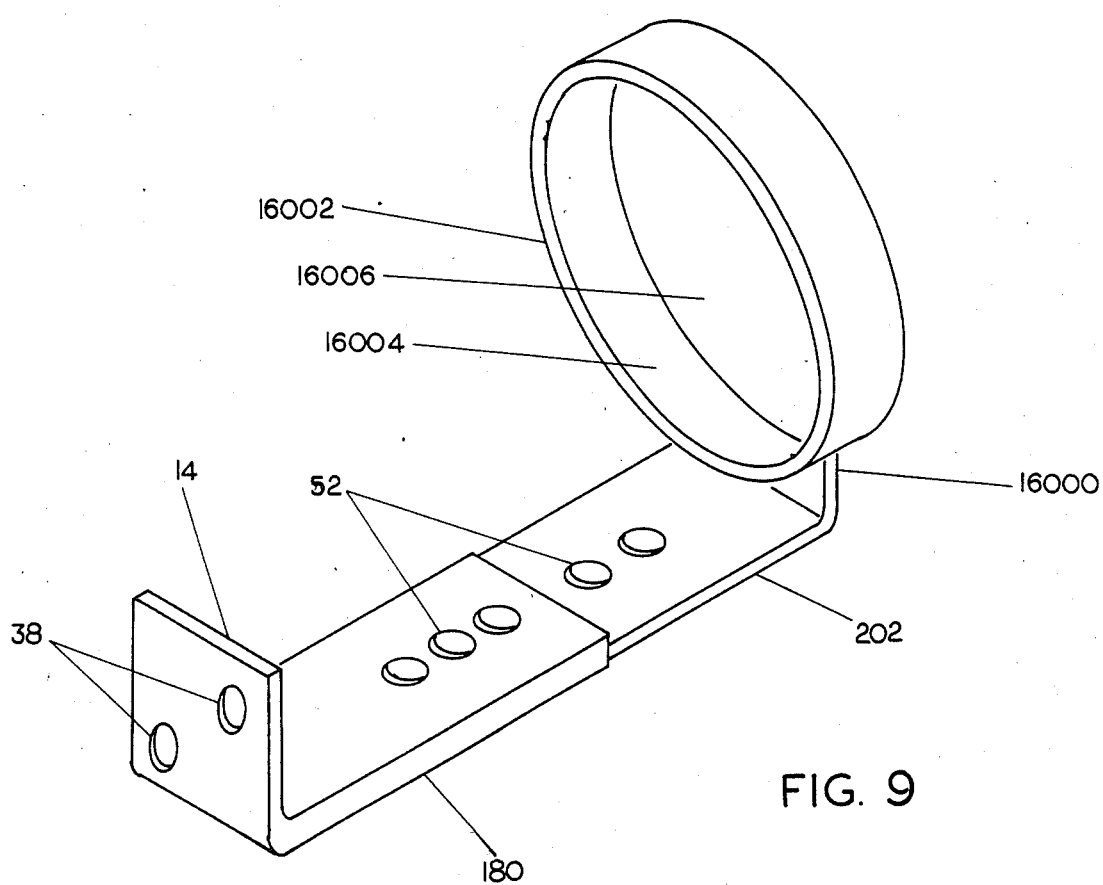
FIG. 9 is a perspective view of a third modification of the invention wherein a cover is provided on the locking leg to receive and cover the valve hand wheel to prevent access thereto when the telescoping sections of the lock body are pushed inwardly to completely cover the valve hand wheel at which time the shackle of a padlock is placed through mating apertures of the telescoped sections to keep them in such position.
Figure 10:
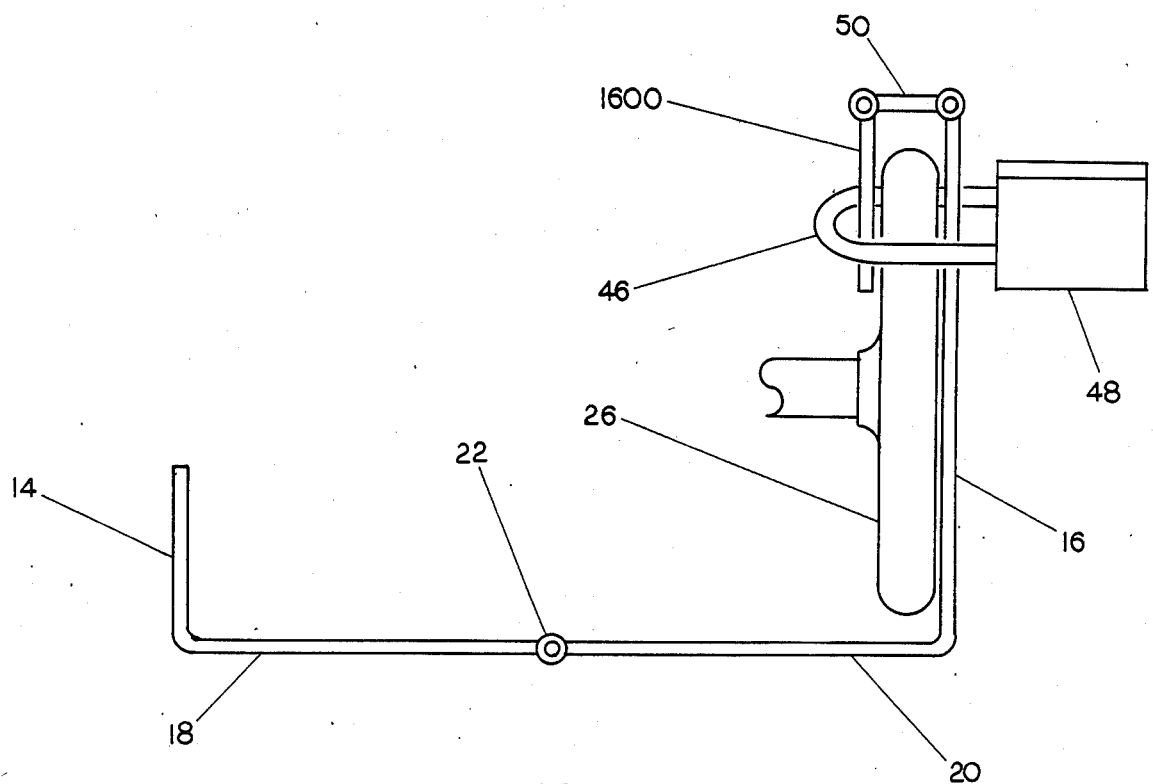
FIG. 10 is a side elevation view of a fourth modification of the invention wherein the locking leg is long enough to completely span the valve hand wheel and a second locking leg is connected to the first by a hinge member for pivoting to the opposite side of the valve hand wheel whereupon apertures in each locking leg are in registration with each other and an aperture through the valve hand wheel to receive the shackle of a padlock.

A valve lock 2 for the outlet valve 4 of a tank truck 6 comprises an elongated metal body portion 8 which extends in a relatively straight line when in the locked position between an upstream first end 10 and a downstream second end 12. A relatively shorter anchor leg 14 extends laterally, at a substantially right angle, from the upstream first end 10 of the body portion 8. A similar shorter locking leg 16 extends laterally in the same direction, also at a substantially right angle, from the downstream second end 12 of the body portion 8.

The elongated body portion 8 is preferably bifurcated, comprising an upstream portion 18 and a downstream portion 20. The two may be pivotally joined by a hinge member 22, whereby the downstream portion 20 may be pivoted between a position in alignment with the valve operator 24 comprising hand wheel 26 for locking engagement therewith and a position out of alignment therewith whereby the valve operator may be rotated to the valve open position.

The upstream portion 18 of the elongated body portion may in the alternative comprise a tubular sleeve 180, having an elongated cavity 182 of cross-sectional configuration and dimension corresponding to that of the elongated shank 202 of the downstream portion 200 of this modified form of the invention, whereby the elongated shank 202 is receivable into the cavity 182 of the tubular sleeve 180. In this modification, the length of the elongated body portion 18 may be adjusted and the downstream portion 200 merely pulled away from the valve operator 24 when it is desired to rotate to the valve open position and pushed back when desired to lock again.

The outlet valve 4 includes an annular mounting flange 28 secured by bolts 30 to the corresponding annular flange 32 of the outlet conduit 34 extending from the tank 36 of the truck 6. The anchor leg 14 of the valve lock 2 includes a pair of apertures 38 spaced apart for registration with a pair of bolts 30 to bolt the anchor leg 14 to the mounting flange 28. Such bolts are then preferably spot welded to permanently secure the anchor leg 14 and the upstream portion 18 (and 180 in the aforesaid modification) rigidly to the annular flange 28 of the outlet valve 4.

The locking leg 16 may include several modifications. A preferred embodiment includes a leg of sufficient length to extend from the elongated body portion 8 to the hand wheel 26 when the anchor leg 14 has been bolted and spot welded to the annular flange 28 and both portions 18 and 20 of the bifurcated body portion 8 are in axial alignment one with the other. The locking leg 16 includes an aperture 40 in registration with an aperture 42 through the hand wheel 26 of the valve operator 24. Such aperture 42 may be the open space between spokes 44 of the hand wheel 26, or an aperture drilled through hand wheel 26 in the event it is of the solid type. The shackle 46 of a padlock 48 may be placed through the corresponding apertures 40 and 42 to hold the hand wheel 26 against rotation from the valve closed position to the valve open position.

A first modification of locking leg 16 includes a second locking leg 160 extending outwardly from the elongated body portion parallel to the first leg 16 and spaced apart therefrom a distance substantially equal to the thickness of the hand wheel 26 to sandwich it between the free ends of the locking legs 16 and 160, each of which have at least one aperture 40 therethrough to receive said shackle 46 of said padlock 48, or a bolt, or other restraining member, which also passes through the aperture 42 of the hand wheel to thereby hold it against rotation.

A second modification of locking leg 16 makes such locking leg long enough to reach beyond the hand wheel 26 with a second locking leg 1600 pivotally connected to the first by a hinge member 50, the second locking leg 1600 being pivotable back on the other side of the hand wheel 26 to a position parallel to and spaced apart from the first leg 16 sandwiching the hand wheel 26 therebetween. Each locking leg 16 and 1600 have apertures 40 in registration with each other when in such position and in registration with aperture 42 of the hand wheel. The shackle 46 of padlock 48 or other restraining member may then be placed through such apertures to hold the hand wheel 26 against rotation.

A third modification of locking leg 16 includes locking leg 16000 having a cover member 16002 formed at its outer end of sufficient dimension and corresponding shape to completely cover the hand wheel 26. The cover member 16002 includes an annular side wall 16004 forming a cup or pocket 16006 in which the hand wheel 26 seats when locking leg 16000 is brought into locking relationship therewith. When this modification of the locking leg is used with the telescoping modification of the elongated body portion 8 comprising tubular sleeve 180 and and elongated shank 202, a series of corresponding apertures 52 are provided through corresponding end regions of tubular sleeve 180 and elongated shank 202 for registration with each other at whatever adjusted length brings the locking end 16000 and its cover member 16002 in position to cover the hand wheel 26 and for it to seat in the pocket 16006 of the cover member 16002. At such point, the shackle 46 of padlock 48 or other locking device may be placed through the aligned apertures 52 to effectively lock the valve 4 in its valve closed position by preventing access to the hand wheel 26. This modification is particularly useful for valves 4 in which the hand wheel is solid, with no spokes or apertures therethrough. With this modification it is not necessary to provide any aperture through the hand wheel. This modification is also useable with valves 4 which may have other types of valve operators than hand wheels, such as lever type operators which can be completely covered to prevent access thereto.

I claim:

1. A valve lock for the outlet valve of a tank truck comprising a rigid elongated member to bear against a portion of said outlet valve when its operator mechanism is attempted to be moved from a valve closed position to a valve open position when said valve lock is in its operative position, including said outlet valve and said operator mechanism thereof movable between a valve closed position and a valve open position, said valve lock including an upstream end for positioning at an upstream portion of said outlet valve when in its operative position and a downstream end for positioning at a downstream portion of said outlet valve when in its operative position, anchor means to anchor said rigid elongated member of said valve lock at said upstream end relative to said outlet valve to restrain movement of said upstream end of said rigid elongated member when so anchored, lock means to prevent movement of said valve operator mechanism of said outlet valve from its said valve closed position to a valve open position at said downstream end relative to said outlet valve when said lock means is operatively connected to said valve operator mechanism, said rigid elongated member having a bearing side edge extending between said upstream end of said valve lock and said downstream end of said valve lock, said bearing side edge being in abutting relationship with said outlet valve and facing in a first direction toward said outlet valve when said upstream end of said value lock is anchored and said downstream end of said valve lock is connected to said valve operator mechanism by said lock means, a portion of said valve operator mechanism being movable when not connected to said valve lock toward said first direction to begin movement of said valve operator mechanism from its said valve closed position to its said valve open position, said downstream end of said valve lock being connected to said portion of said valve operator mechanism which is movable toward said first direction whereby said bearing side edge abutting against said outlet valve restrains said downstream end of said valve lock and said portion of said valve operator mechanism connected thereto from movement toward said first direction until disconnected from said valve lock.

2. a valve lock for the outlet valve of a tank truck as set forth in claim 1, wherein said rigid elongated member is bifurcated and includes an upstream section and a downstream section, said downstream section including a rigid, integrally formed flange extending transversely therefrom, including a hinge member connecting said upstream section to said downstream section to enable pivotal movement of said downstream section when said anchor means anchors said rigid elongated member at said upstream end relative to said outlet valve between a position wherein said rigid integrally formed flange of said downstream section is adjacent said operator mechanism of said outlet valve and a position wherein said rigid integrally formed flange is away from said operator mechanism of said outlet valve.

3. A valve lock for the outlet valve of a tank truck as set forth in claim 1, wherein said rigid elongated member is bifurcated and includes an upstream section and a downstream section, one of said sections being tubular having an elongated cavity therein and said bearing side edge facing and abutting against said outlet valve thereon, the other of said sections comprising an elongated shank member having a cross-sectional configuration and dimension corresponding to that of said elongated cavity of said first section for telescoping and sliding reception in said elongated cavity, whereby said downstream section is slidably movable between a position adjacent said operator mechanism of said outlet valve and a position away from said operator mechanism of said outlet valve.

4. A valve lock for the outlet valve of a tank truck as set forth in claim 1, wherein said lock means includes a first lock leg extending from said rigid elongated member nearer said downstream end than said upstream end thereof, lock leg connecting means to connect said lock leg to said valve operator mechanism to prevent movement thereof from a valve closed position to a valve open position when said valve lock is placed in position for operative use relative to said outlet valve.

5. A valve lock for the outlet valve of a tank truck as set forth in claim 4, wherein said lock means includes a second lock leg extending from said rigid elongated member at a location spaced apart from and substantially parallel to said first lock leg to sandwich said operator mechanism between said first lock leg and said second lock leg when said valve lock is placed in position for operative use relative to said outlet valve.

6. A valve lock for the outlet valve of a tank truck as set forth in claim 4, wherein said lock means includes a spacing pivot member pivotally connected to and extending from the free end of said first lock leg, and a second lock leg pivotally connected to said spacing pivot member for pivotal movement to a position substantially parallel to and spaced apart from said first lock leg a selected distance slightly greater than the dimension of said operator mechanism to sandwich it between said first lock leg and said second lock leg when said valve lock is placed in position for operative use relative to said outlet valve, the length of said spacing pivot member corresponding to said selected distance which said second lock leg is spaced apart from said first lock leg.

7. A valve lock for the outlet valve of a tank truck as set forth in claim 1, wherein said lock means includes a cover member to cover said operator mechanism and prevent operative access thereto when said valve lock is placed in position for operative use relative to said outlet valve, and means to move said cover member from said operator mechanism while said upstream end of said rigid elongated member remains anchored to said outlet valve.

8. A valve lock for the outlet valve of a tank truck as set forth in claim 4, wherein said valve operator mechanism includes a hand wheel, an aperture through said hand wheel, said lock leg connecting means includes an aperture through said first lock leg in registration with said aperture through said hand wheel when said valve lock is placed in position for operative use relative to said outlet valve, and the shackle of lock means through said aperture of said hand wheel and through said aperture of said first lock leg to lock and hold said hand wheel against movement from a valve closed position to a valve open position.

9. A valve lock for the outlet valve of a tank truck, comprising a rigid elongated member to bear against a portion of said outlet valve when its operator mechanism is attempted to be moved from a valve closed position to a valve open position when said valve lock is in its operative position, including said outlet valve and said operator mechanism thereof movable between a valve closed position and a valve open position, said valve lock including an upstream end for positioning at an upstream portion of said outlet valve when in its operative position and a downstream end for positioning at a downstream portion of said outlet valve when in its operative position, anchor means to anchor said rigid elongated member of said valve lock at said upstream end relative to said outlet valve to restrain movement of said upstream end of said rigid elongated member when so anchored, lock means to prevent movement of said valve operator mechanism of said outlet valve from its said valve closed position to a valve open position at said downstream end relative to said outlet valve when said lock means is operatively connected to said valve operator mechanism, wherein said rigid elongated member is bifurcated and includes an upstream section and a downstream section, one of said sections being tubular having an elongated cavity therein, the other of said sections comprising an elongated shank member having a cross-sectional configuration and dimension corresponding to that of said elongated cavity of said first section for telescoping and sliding reception in said elongated cavity, whereby said downstream section is slidably movable between a position adjacent said operator mechanism of said outlet valve and a position away from said operator mechanism of said outlet valve, wherein said lock means includes a cover member extending from said rigid elongated bifurcated telescoping member at a location nearer said downstream end than said upstream end thereof, said cover member having a dimension and configuration corresponding to that of said valve operator mechanism to cover it and prevent operative access thereto when said valve lock is placed in position for operative use relative to said outlet valve, and means to lock said rigid, elongated, bifurcated telescoping member against movement away from said operative use position.

* * * * *